US011036043B2

(12) United States Patent
Derakhshani

(10) Patent No.: US 11,036,043 B2
(45) Date of Patent: Jun. 15, 2021

(54) IDENTITY AUTHENTICATION USING LENS FEATURES

(71) Applicant: Advanced New Technologies Co., Ltd., George Town (KY)

(72) Inventor: Reza R. Derakhshani, Shawnee, KS (US)

(73) Assignee: Advanced New Technologies Co., Ltd., Grand Cayman (KY)

( * ) Notice: Subject to any disclaimer, the term of this patent is extended or adjusted under 35 U.S.C. 154(b) by 231 days.

(21) Appl. No.: 16/250,795

(22) Filed: Jan. 17, 2019

(65) Prior Publication Data

US 2020/0233202 A1 Jul. 23, 2020

(51) Int. Cl.

| | | |
|---|---|---|
| *G02B 26/08* | (2006.01) | |
| *G01B 11/25* | (2006.01) | |
| *G01B 11/26* | (2006.01) | |
| *G02B 25/00* | (2006.01) | |
| *G06K 9/00* | (2006.01) | |
| *G06T 7/586* | (2017.01) | |
| *H04N 5/235* | (2006.01) | |
| *G06F 21/32* | (2013.01) | |

(52) U.S. Cl.
CPC .......... *G02B 26/0825* (2013.01); *G01B 11/25* (2013.01); *G01B 11/26* (2013.01); *G02B 25/001* (2013.01); *G06F 21/32* (2013.01); *G06K 9/00281* (2013.01); *G06K 9/00604* (2013.01); *G06K 9/00617* (2013.01); *G06T 7/586* (2017.01); *H04N 5/2354* (2013.01)

(58) Field of Classification Search
None
See application file for complete search history.

(56) References Cited

U.S. PATENT DOCUMENTS

| | | | |
|---|---|---|---|
| 9,514,538 B2 * | 12/2016 | Ebisawa | A61B 3/111 |
| 10,288,879 B1 * | 5/2019 | Rana | G02B 27/0093 |
| 10,324,529 B1 * | 6/2019 | Rana | G02B 27/0093 |
| 2006/0193515 A1 * | 8/2006 | Kim | G06K 9/00228 |
| | | | 382/173 |
| 2008/0175448 A1 * | 7/2008 | Fujiwara | G06K 9/00208 |
| | | | 382/118 |

(Continued)

FOREIGN PATENT DOCUMENTS

| | | |
|---|---|---|
| JP | 5033014 | 9/2012 |
| KR | 20170031542 | 3/2017 |

OTHER PUBLICATIONS

Ahmad Saeed Mohammad, Ajita Rattani, Reza Derakhshani, "Eyebrows and eyeglasses as soft biometrics using deep learning", IET Biom., 2019, vol. 8 Iss. 6, pp. 378-390 (Year: 2019).*

(Continued)

*Primary Examiner* — Gandhi Thirugnanam
(74) *Attorney, Agent, or Firm* — Fish & Richardson P.C.

(57) ABSTRACT

Methods, systems, and apparatus, including computer programs encoded on a computer storage medium, for determining the identity of a user. In one aspect, a method comprises: obtaining at least one image depicting a reflection of light from a lens that is included in a set of eyeglasses; determining, based on the reflection of light from the lens, a set of features characterizing the lens; and determining an identity of a corresponding user based at least in part on the set of features characterizing the lens.

28 Claims, 6 Drawing Sheets

(56) References Cited

U.S. PATENT DOCUMENTS

| | | | | |
|---|---|---|---|---|
| 2013/0051631 | A1* | 2/2013 | Hanna | G06K 9/00617 |
| | | | | 382/117 |
| 2013/0194407 | A1* | 8/2013 | Kim | G06K 9/00617 |
| | | | | 348/78 |
| 2015/0009313 | A1* | 1/2015 | Noda | G06K 9/00604 |
| | | | | 348/78 |
| 2015/0338915 | A1* | 11/2015 | Publicover | H04N 5/44504 |
| | | | | 345/633 |
| 2016/0210497 | A1* | 7/2016 | Rougeaux | G06F 3/013 |
| 2016/0270656 | A1* | 9/2016 | Samec | A61B 3/024 |
| 2016/0379093 | A1* | 12/2016 | Yoshioka | G06K 9/00604 |
| | | | | 382/159 |
| 2017/0285741 | A1* | 10/2017 | Park | G06K 9/00617 |
| 2017/0351929 | A1* | 12/2017 | Kim | G06K 9/00919 |
| 2018/0349721 | A1* | 12/2018 | Agrawal | G06K 9/00617 |
| 2019/0108687 | A1* | 4/2019 | Kelly | G06T 15/08 |
| 2019/0266399 | A1* | 8/2019 | Kanamori | G06K 9/00604 |
| 2019/0278987 | A1* | 9/2019 | Eskilsson | G06F 3/013 |
| 2020/0233202 | A1* | 7/2020 | Derakhshani | G01B 11/25 |
| 2020/0311889 | A1* | 10/2020 | Pasula | G06F 21/32 |
| 2020/0311892 | A1* | 10/2020 | Pasula | H04N 5/2354 |

OTHER PUBLICATIONS

Berg et al., "Personal Identification Based on Prescription Eyewear," Journal of Forensic Sciences, Mar. 2007, 52 (2):406-411.
PCT International Search Report and Written Opinion in International Application No. PCT/US2020/013273, dated Jun. 25, 2020, 18 pages.

* cited by examiner

IDENTITY AUTHENTICATION USING LENS FEATURES

BACKGROUND

This specification relates to identity authentication systems.

An identity authentication system can be used to determine the identity of a user, for example, a user of a kiosk (e.g., an ATM kiosk) or a personal device (e.g., a smartphone). In some cases, an identity authentication system can determine the identity of a user based at least in part on ocular biometric features derived from the unique appearance of the eye of the user.

SUMMARY

This specification describes an authentication system implemented as computer programs on one or more computers in one or more locations that determines the identity of a user.

According to a first aspect there is provided a method including: obtaining at least one image depicting a reflection of light from a lens that is included in a set of eyeglasses, determining, based on the reflection of light from the lens, a set of features characterizing the lens, and determining an identity of a corresponding user based at least in part on the set of features characterizing the lens.

According to a second aspect there is provided a system that includes computer-readable memory, a feature generation engine, and an authentication engine. Each of the feature generation engine and the authentication engine includes one or more processing devices. The feature generation engine is configured to obtain at least one image depicting a reflection of light from a lens that is included in a set of eyeglasses, and determine, based on the reflection of light from the lens, a set of features characterizing the lens. The authentication engine is configured to determine or verify an identity of a corresponding user based at least in part on the set of features characterizing the lens.

According to another aspect there is provided one or more non-transitory computer-readable storage devices storing instructions that upon execution cause one or more processing devices to perform various operations. The operations include obtaining at least one image depicting a reflection of light from a lens that is included in a set of eyeglasses, and determining, based on the reflection of light from the lens, a set of features characterizing the lens. The operations also include determining an identity of a corresponding user based at least in part on the set of features characterizing the lens.

Implementations of the above aspects can include one or more of the following features.

In some implementations, the light is a predetermined pattern of light projected from one or more light sources. In some implementations, at each of multiple time steps, the light sources project a respective pattern of light onto the lens, obtaining the at least one image depicting the reflection of light from the lens includes: obtaining, at each of the plurality of time steps, a respective image depicting a reflection of the respective pattern of light projected onto the lens at the time step, and determining the set of features characterizing the lens includes: determining at least a portion of the set of features characterizing the lens based on the reflection of the respective pattern of light projected onto the lens at each of the plurality of time steps. In some implementations, at each of the multiple time steps, the light sources project onto the lens a given pattern of light that is rotated to a respective angle. In some implementations, determining the set of features characterizing the lens includes: determining a geometry of the reflection of light from the lens, and determining one or more features characterizing the lens based on the geometry of the reflection of light from the lens. In some implementations, determining the geometry of the reflection of light from the lens includes: identifying: (i) a first reflection of light from an outer surface of the lens, and (ii) a second reflection of light from an inner surface of the lens, and determining: (i) a first geometry of the first reflection of light from the outer surface of the lens, and (ii) a second geometry of the second reflection of light from the inner surface of the lens. In some implementations, determining the one or more features characterizing the lens based on the geometry of the reflection of light from the lens includes: determining one or more features based on a difference between the first geometry and the second geometry. In some implementations, determining the one or more features based a difference between the first geometry and the second geometry includes: determining one or more features based on a distortion between the first geometry and the second geometry. In some implementations, determining the one or more features based on a difference between the first geometry and the second geometry includes: determining one or more features based on a difference in size between the first geometry and the second geometry. In some implementations, the set of features characterize properties of the lens including one or more of: a spherical power of the lens, a cylindrical power of the lens, a cylindrical angle of the lens, a coating of the lens, a tint of the lens, a curvature of an inner surface of the lens, and a curvature of an outer surface of the lens. In some implementations, the method further includes: determining, based on a reflection of light from a cornea of an eye of the corresponding user, an additional set of features characterizing the lens, and determining the identity of the corresponding user based at least in part on the additional set of features characterizing the lens. In some implementations, determining the additional set of features characterizing the lens includes: determining a first focal length that causes the reflection of light from the lens to be substantially in focus, determining a second focal length that causes the reflection of light from the cornea to be substantially in focus, and determining an additional feature based on a difference between the first focal length and the second focal length. In some implementations, the additional feature is determined by subtracting the second focal length from the first focal length. In some implementations, determining the additional set of features characterizing the lens includes: determining a third focal length that causes the reflection of light from the cornea to be substantially in focus except along a particular axis, determining a fourth camera focal length that causes the reflection of light from the cornea to be substantially out of focus except along the particular axis, and determining an additional feature based on a difference between the third focal length and the fourth focal length. In some implementations, the additional feature is determined by subtracting the fourth focal length from the third focal length. In some implementations, determining the identity of the corresponding user based at least in part on the set of features characterizing the lens includes: determining that a difference between: (i) the set of features characterizing the lens, and (ii) a template set of features characterizing the lens which is determined during an enrollment process, satisfies a threshold condition (e.g., exceeds a predetermined threshold value), and in response to determining that the difference satisfies the threshold condition, determining the identity of the corresponding user based on one or more additional features characterizing the identity of the corresponding user.

Particular embodiments of the subject matter described in this specification can be implemented so as to realize one or more of the following advantages.

The authentication system described in this specification can determine the identity of a user based at least in part on a set of features which characterize properties of one or both of the lenses of eyeglasses of the user. The properties of the lenses of the eyeglasses of the user may be at least partially unique, for example, if the eyeglasses are prescription eyeglasses which are designed to correct vision defects specific to the user. Therefore, by using features characterizing the properties of the lenses of the eyeglasses of the user in determining the identity of the user, the system may be able to determine the identity of the user with a higher level of confidence than would otherwise be possible. In particular, eyeglasses being worn by a user may degrade the quality of ocular biometric features derived from the unique appearance of the eye of the user (e.g., the structure of eye vasculature) which are used in determining the identity of the user. For example, the quality of ocular biometric features may be degraded because the eyes are partially obscured by reflections of ambient light from the lenses of the eyeglasses. By using features characterizing the properties of the lenses of the eyeglasses in determining the identity of the user, the system can mitigate the degradation in the quality of ocular biometric features caused by the eyeglasses.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
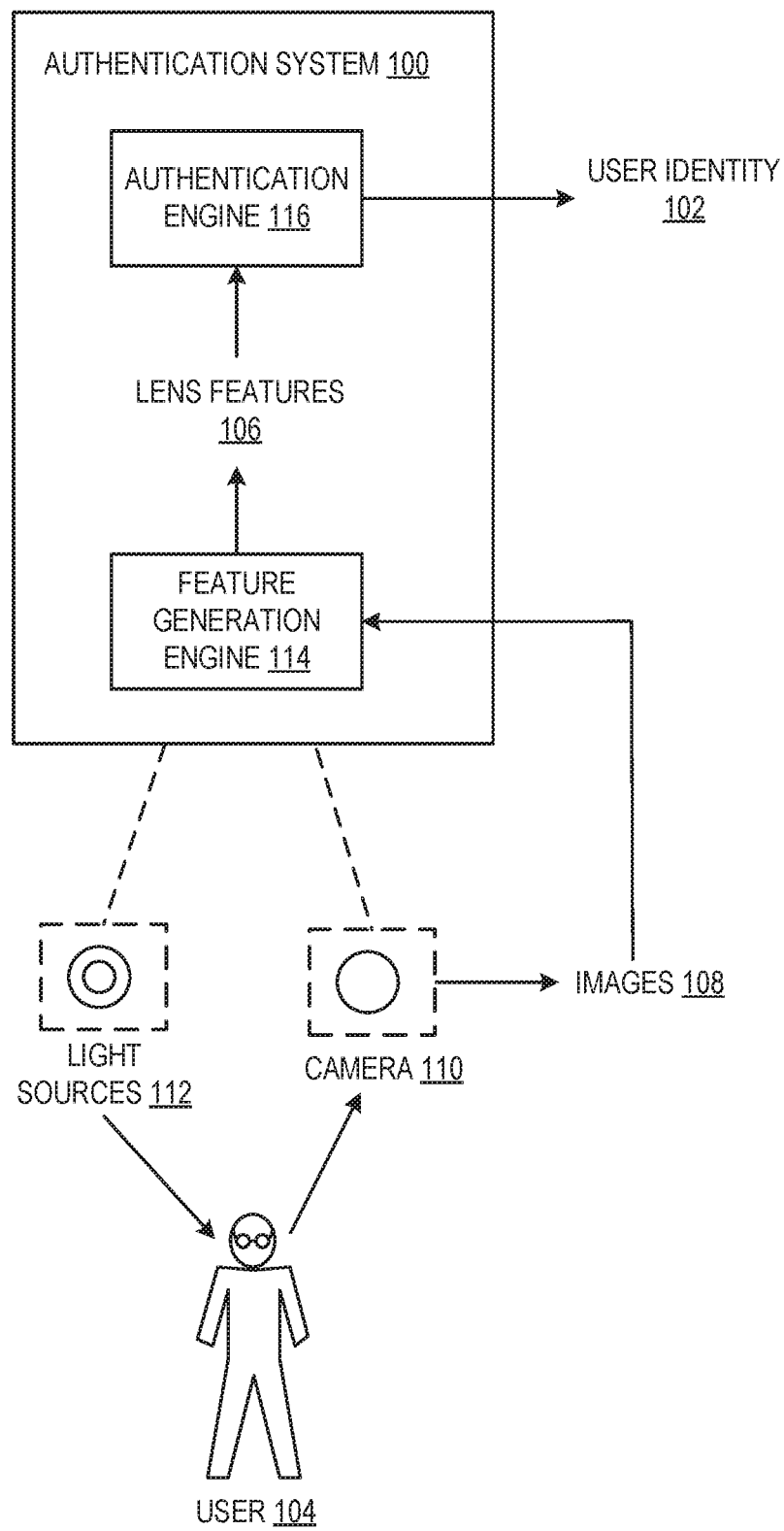
FIG. 1 is a block diagram of an example authentication system.

This specification describes an authentication system that can determine the identity of a user based at least in part on a set of features which characterize properties of one or both of the lenses of eyeglasses of the user. The lenses of a given pair of eyeglasses can have unique properties which distinguish them from the lenses of other eyeglasses, in particular if they are prescription eyeglasses which are designed to correct vision defects specific to the user. Therefore, the properties of the lenses of eyeglasses of a user may be at least partially unique to the user and can be used in determining the identity of the user. The properties of a lens can include, for example, the respective curvatures of the inner and outer surfaces of the lens, the spherical power of the lens, the cylindrical power of the lens, the tint of the lens, the material of the lens, and the coating used on the lens.

As will be described in more detail below, the authentication system can generate features characterizing the lenses of eyeglasses based on the reflection of light from: the lenses of the eyeglasses, the corneas of the user wearing the eyeglasses, or both. The authentication system described in this specification can be used in any of a variety of settings. A few examples follow.

In some implementations, the authentication system is used in a kiosk. For example, the kiosk may be an automated teller machine (ATM) that allows users to deposit money, withdraw money, or view their financial information. As another example, the kiosk may be deployed at the entrance to a location (e.g., an arena or stadium), and may grant or deny users access to the location. As another example, the kiosk may be deployed at a restaurant (e.g., a fast-food outlet), and may allow users to order and pay for food. In this example, the kiosk may include a display device (e.g., a capacitive touch screen) that allows a user to select and order food. Once the user completes the selection (e.g., by user-interfaces presented on the display device), the user may be prompted to look towards a kiosk camera. The authentication system may use the kiosk camera to capture one or more images of the user, including one or more images depicting light reflecting from the lenses of eyeglasses (and the corneas) of the user. The authentication system may process the images to generate features characterizing properties of the lenses of the eyeglasses, and thereafter use the features in determining the identity of the user. After the authentication system determines the identity of the user, the kiosk may deduct payment for the food from a bank account associated with the identity of the user.

In some implementations, the authentication system is used in a personal device of a user, for example, a smartphone, smartwatch, or desktop computer. The device may use the authentication system to determine the identity of the user before allowing the user to perform "restricted" actions. Examples of restricted actions may include unlocking the device, accessing certain data using the device (e.g., financial data or medical data), or performing certain actions using the device (e.g., downloading applications or changing passwords). When the device determines a user is attempting to perform a restricted action, the authentication system may use a device camera to capture one or more images depicting light reflecting from the lenses of eyeglasses (and the corneas) of the user. The authentication system may process the images to generate features characterizing properties of the lenses of the eyeglasses, and thereafter use the features in determining the identity of the user. After the authentication system determines the identity of the user, the device can determine whether the user is authorized to perform the restricted actions.

FIG. 1 is a block diagram of an example authentication system 100. The authentication system 100 is an example of a system implemented as computer programs on one or more computers in one or more locations in which the systems, components, and techniques described below are implemented.

The authentication system 100 is configured to determine the identity 102 of a user 104 (e.g., of a kiosk or a personal device) based at least in part on lens features 106 characterizing properties of one or both of the lenses of eyeglasses of the user 104. The authentication system 100 generates the lens features 106 by processing one or more images 108 which depict light reflected from one or both of the lenses of the eyeglasses of the user 104. As described earlier, the authentication system 100 may be used in a kiosk (e.g., an ATM kiosk), a personal device (e.g., a smartphone), or as a component of any other appropriate system.

The authentication system 100 uses a camera 110 to capture the images 108 which depict light reflected from the lenses of the eyeglasses of the user 104. The light is projected onto the lenses by one or more light sources 112 (e.g., one or more LCD screens or LED arrays). The camera 110 and the light sources 112 may be, for example, integrated components of a kiosk (e.g., an ATM kiosk) or a personal device (e.g., a smartphone) using the authentication system 100 to determine the identity 102 of the user 104. In some cases, the authentication system 100 may use the light sources 112 to project a specific (e.g., predetermined) pattern of light onto the lenses of the eyeglasses of the user 104. For example, the specific pattern of light may include a constellation of points of light or multiple concentric rings of light.

In some implementations, rather than projecting a static pattern of light onto the lenses of the eyeglasses of the user 104, the light sources 112 can project a time-varying pattern of light (i.e., a pattern of light that changes over multiple time steps). For example, the authentication system 100 can use the light sources 112 to rotate the pattern of light projected onto the lenses through a predetermined sequence of rotation angles over multiple time steps. The authentication system 100 can use the camera 110 to capture multiple images 108 which depict the pattern of light reflected from the lenses at different time steps. A "time step" refers to a respective point in time.

The authentication system 100 processes the images 108 depicting light reflecting from the lenses of the eyeglasses of the user 104 using a feature generation engine 114 to generate the lens features 106. The lens features 106 can be represented as an ordered collection of numerical values (e.g., a vector, matrix, or higher-order tensor) and characterize properties of one or both of the lenses of the eyeglasses of the user 104. The properties of the lenses may include, for example, the curvatures of the inner and outer surfaces of the lenses, the spherical power of the lenses, the cylindrical power of the lenses, the tint of the lenses, the material of the lenses, and the coating used on the lenses.

In some cases, the lens features 106 can directly characterize the properties of the lenses, for example, by including numerical values which directly specify the spherical or cylindrical powers of the lenses. In other cases, the lens features 106 can indirectly characterize the properties of the lenses by including numerical values which are functions of (i.e., which depend on) the properties of the lenses without directly specifying the properties of the lenses. For example, the lens features 106 can include numerical values which characterize the geometry of the light reflected from the lenses and by doing so indirectly characterize properties of the lenses including the curvatures of the inner and outer surfaces of the lenses. The "geometry" of light reflected from a lens can refer to any aspect of the shape or arrangement of the light reflected from the lens. An example process for generating lens features 106 characterizing properties of the lenses of the eyeglasses of the user 104 is described with reference to FIG. 7.

If the user 104 is wearing the eyeglasses when the light sources 112 project the light onto the lenses, the images 108 may also depict light reflected from the corneas (i.e., of the eyes) of the user 104. The manner in which the light reflects from the corneas of the user 104 depends in part on the properties of the lenses of the eyeglasses being worn by the user 104. The feature generation engine 114 can generate lens features 106 based on the light reflected from the corneas of the user 104. For example, the feature generation engine 114 can generate lens features 106 based on a difference between respective camera focal lengths that cause: (i) the light reflected from a lens of the eyeglasses, and (ii) the light reflected from the cornea of the corresponding eye of the user 104, to be substantially in focus. In this example, the generated lens features 106 characterize the spherical power of the lens. Generating lens features 106 based on the light reflected from the corneas of the user 104 is described further with reference to FIG. 7. Such calculations can be aided by face to camera distance garnered by time of flight or stereo depth sensors, inter-ocular distance, or similar.

The authentication system 100 determines the identity 102 of the user 104 at least in part by processing the lens features 106 using an authentication engine 116, for example, by matching the lens features 106 to a set of "template" lens features associated with a particular user profile. In some cases, the authentication engine 116 determines the identity 102 of the user 104 using other data in addition to the lens features 106. For example, the authentication engine 116 may additionally process features characterizing biometric properties of the user 104 (e.g., eye surface vasculature structure or facial appearance), or a password or PIN submitted by the user 104, in determining the identity 102 of the user 104.

The hardware and software components implementing the authentication system 100 can be positioned in any appropriate locations. For example, some or all of the hardware and software components implementing the authentication system 100 may be positioned in a kiosk or personal device using the authentication system 100 to determine the identity 102 of the user 104. As another example, some or all of the hardware and software components implementing the authentication system 100 may be remotely positioned, for example, in a cloud-computing environment. The lighting elements for inducing internal lens reflections can be positioned at varying spatial locations to facilitate recording of such reflections.

Figure 2:
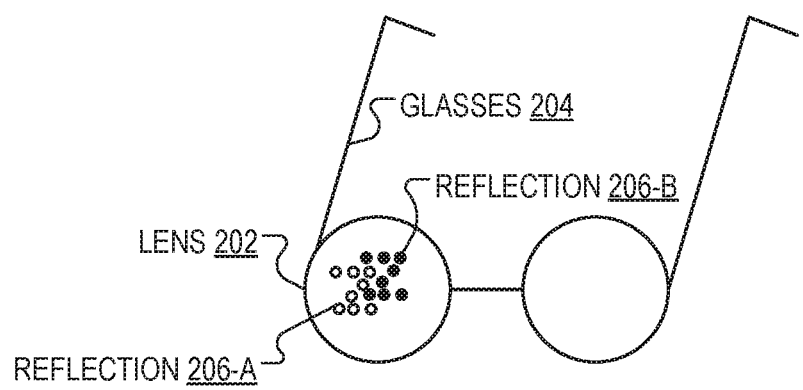
FIG. 2 depicts an example of light reflected from a lens of a set of eyeglasses.

FIG. 2 depicts an example of a pattern of light reflected from a lens 202 of a set of eyeglasses 204. In this example, the pattern of light is a constellation of points of light which may, for example, be projected onto the lens by an array of LED light sources (or by any other appropriate light sources, including those produced by an illuminated display such as an LCD or OLED screen). The pattern of light reflected from the lens includes: (i) a pattern of light reflected from the outer surface of the lens (e.g., the reflection 206-A), and (ii) a pattern of light reflected from the inner surface of the lens (e.g., the reflection 206-B). As will be described with reference to FIG. 7, the authentication system 100 can generate lens features 106 based on a difference in the respective geometries of the pattern of light reflected from the outer surface (e.g., the reflection 206-A) and inner surface (e.g., the reflection 206-B) of the lens.

Figure 3:
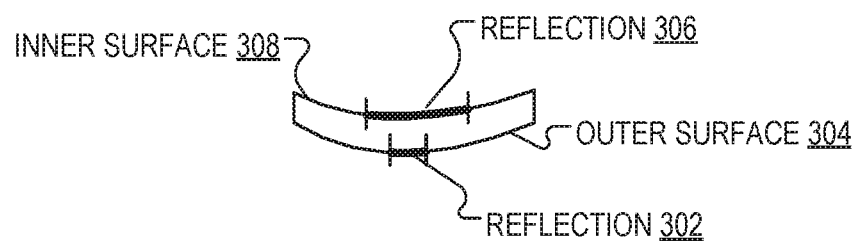
FIG. 3 depicts a reflection of light from the outer surface of a lens and a reflection of light from the inner surface of the lens.

FIG. 3 depicts a reflection of light 302 from the outer surface 304 of a lens and a reflection of light 306 from the inner surface 308 of the lens. In general, the respective curvatures of the outer surface 304 and the inner surface 308 of the lens may be different, which may contribute to causing differences in the respective geometries of the reflections 302 and 306.

Figure 4:
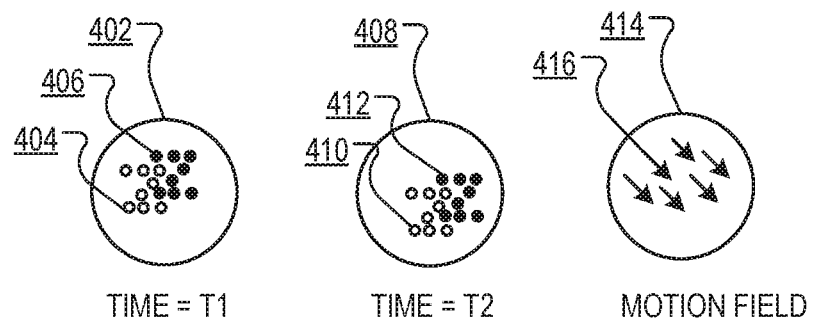
FIG. 4 depicts: (i) an image of respective reflections of light from the outer and inner surfaces of a lens at a time T1, (ii) an image of respective reflections of light from the outer and inner surfaces of the lens at a time T2, and (iii) a corresponding optical flow image.

FIG. 4 depicts: (i) an image 402 of respective reflections 404 and 406 of light from the outer and inner surfaces of a lens at a time T1, (ii) an image 408 of respective reflections 410 and 412 of light from the outer and inner surfaces of the lens at a time T2, and (iii) an optical flow image 414. As will be described in more detail with reference to FIG. 8, the optical flow image 414 defines a motion field characterizing the displacement (e.g., as depicted by the arrow 416) of each pixel from image 402 to image 408. The authentication system 100 can process the optical flow image 414 to identify the respective reflections from the inner and outer surfaces of the lens based on differences in their respective motions as characterized by the optical flow image.

Figure 5:
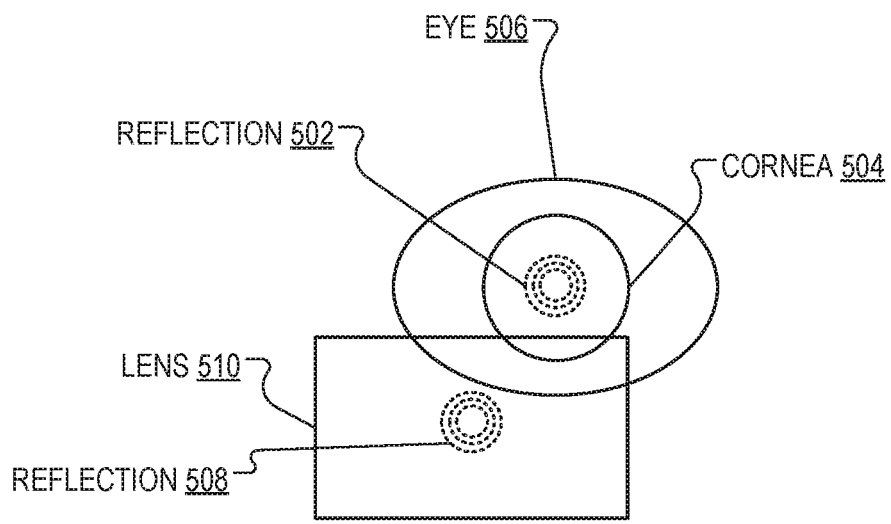
FIG. 5 depicts an example of: (i) a reflection of a pattern of light from a cornea of an eye of a user, and (ii) a reflection of the pattern of light from a lens of eyeglasses being worn by the user.
Figure 6:
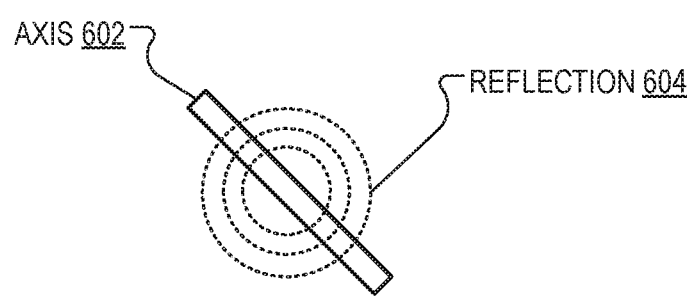
FIG. 6 depicts an axis through a reflection of a pattern of light.

FIG. 5 depicts an example of: (i) a reflection 502 of a pattern of light from a cornea 504 of an eye 506 of a user, and (ii) a reflection 508 of the pattern of light from a lens 510 of eyeglasses being worn by the user. In this example, the pattern of light includes multiple concentric rings of light which may, for example, be projected onto the cornea 504 through the lens 510 by an array of LED light sources (or from any other appropriate light sources). In some cases, the lens of the eyeglasses being worn by the user includes a cylindrical power and angle that are selected to correct for astigmatism in the eye of the user. In these cases, an image of the pattern of light reflected from the cornea 504 that is captured using a particular camera focal length can depict the pattern of light as substantially in or out of focus except along a particular axis (e.g., a figurative straight line through the pattern of light). FIG. 6 depicts a particular axis 602 through a reflection 604 of a pattern of light. As will be described in more detail with reference to FIG. 4, the authentication system 100 can generate lens features 106 based on the camera focal lengths which causes the light reflected from the cornea to be substantially in or out of focus except along the particular axis.

Figure 7:
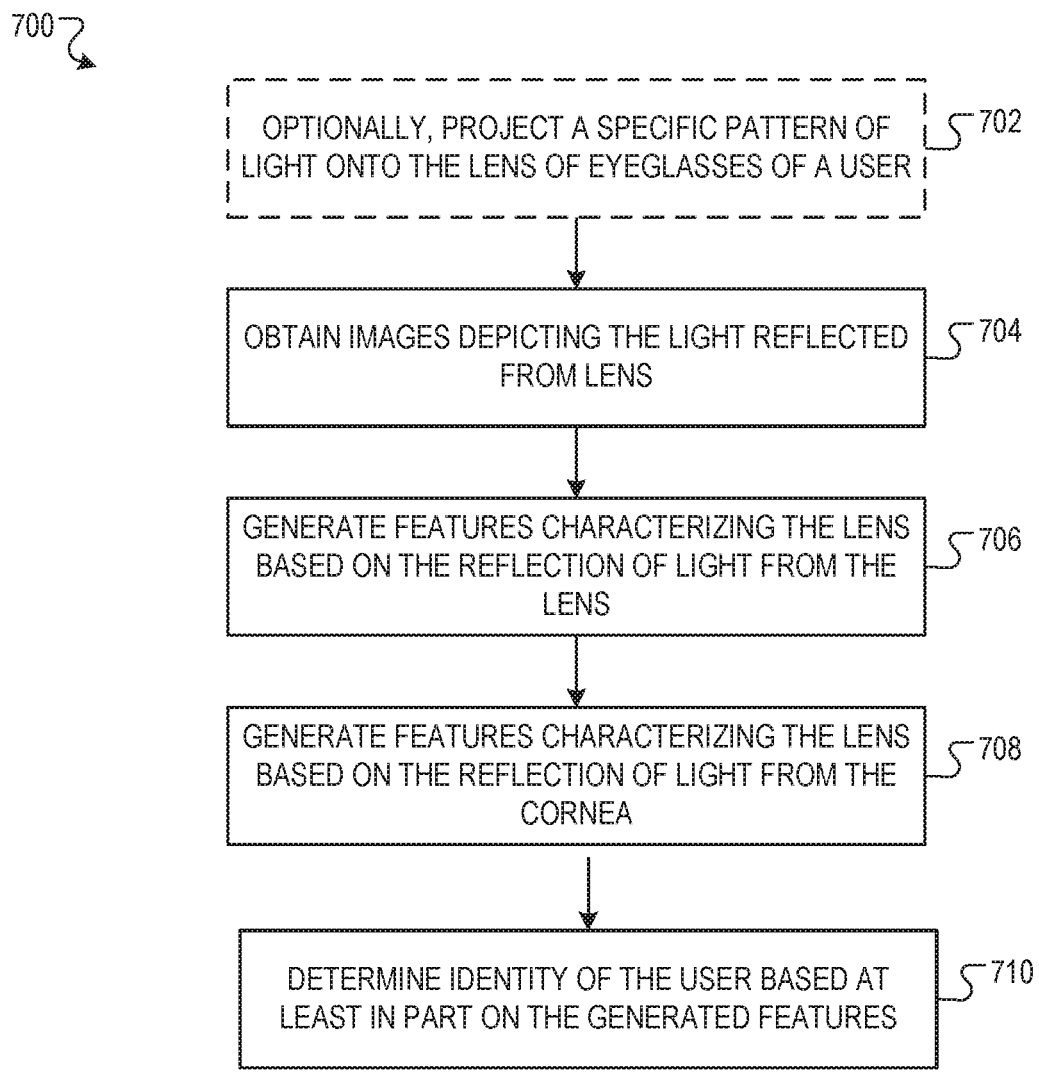
FIG. 7 is a flow diagram of an example process for determining the identity of a user based at least in part on features characterizing a lens of eyeglasses of the user.

FIG. 7 is a flow diagram of an example process 700 for determining the identity of a user (e.g., of a kiosk or personal device) based at least in part on features characterizing a lens of eyeglasses of the user. For convenience, the process 700 describes determining features characterizing a particular lens of the eyeglasses, but more generally, respective features characterizing each lens of the eyeglasses can be determined. For convenience, the process 700 will be described as being performed by a system of one or more computers located in one or more locations. For example, an authentication system, e.g., the authentication system 100 of FIG. 1, appropriately programmed in accordance with this specification, can perform the process 700.

Optionally, the system uses one or more light sources to project a specific (e.g., predetermined) pattern of light onto the lens of the eyeglasses (702). The light sources may include, for example, an LCD screen or an LED array, and may be disposed in a kiosk (e.g., an ATM kiosk) or a personal device (e.g., a smartphone). The system can use the light sources to project any appropriate pattern of light onto the lens, for example, a constellation of points of light or multiple concentric rings of light. In some implementations, rather than projecting a static pattern of light onto the lens, the system can use the light sources to project a time-varying pattern of light onto the lens (i.e., a pattern of light that changes over multiple time steps). For example, the system can use the light sources to project a spatially moving pattern of light onto the lens. In a particular example, the system may rotate the pattern of light projected onto the lens through a predetermined sequence of rotation angles over multiple time steps, for instance to find cylindrical properties of the corrective lens. As another example, the system can use light sources to project a temporally-coded pattern of light onto the lens. In a particular example, the system may project a pattern of light onto the lens which has a different predetermined color at each of multiple time steps. In another particular example, the system may project a pattern of light onto the lens using an on-off Barker coded light source. Using a temporally-coded pattern of light can facilitate isolating and amplifying the reflection of light from the lens (and the cornea) while generating features based on the geometry of the light reflected from the lens (e.g., as described with reference to FIG. 8).

In some cases, the system does not actively use light sources to project a specific (e.g., predetermined) pattern of light onto the lens. Rather, light may be projected onto the lens by any of a variety of light sources in proximity to the lens (e.g., a nearby lightbulb).

The system uses a camera to obtain one or more images which depict the light reflected from the lens (704). The images may also depict the light reflected from the cornea of the eye of the user (i.e., if the user is wearing the eyeglasses). If the system uses light sources to project a time-varying pattern of light onto the lens, the system may obtain a respective image which depicts the light reflected from the lens at each of multiple time steps. The system may obtain the images using a camera which is, for example, disposed in a kiosk (e.g., an ATM kiosk) or a personal device (e.g., a smartphone). The system can use any appropriate type of camera to obtain the images. In a particular example, the system may use a light-field camera to obtain the images, that is, a camera which captures images defining both the intensity and direction of light at each pixel. In some other implementations, the system may use a shallow depth of focus and rapid focus stacking camera system.

In some cases, the system may determine respective focal lengths of the camera which cause specific regions of the images captured by the camera to be substantially in focus or substantially out of focus. For example, the system may determine respective focal lengths which cause: (i) the light reflected from the lens to be substantially in focus, (ii) the light reflected from the cornea to be substantially in focus, (iii) the light reflected from the cornea to be substantially in focus except along a particular axis, and (iv) the light reflected from the cornea to be substantially out of focus except along the particular axis. To determine the focal length of the camera which causes a specific part of the image to be substantially in focus (or out of focus), the system can step through a range of possible focal lengths and capture a respective image corresponding to each focal length. Alternatively, if the system uses a light-field camera, the system may capture a single image and process the single image to determine the respective focal lengths of the camera which cause specific parts of the image to be substantially in focus (or out of focus). The system can use the determined focal lengths to facilitate the generation of features characterizing the lens, as will be described further with reference to step 708.

The system may determine a region of an image (e.g., the region that depicts the light reflected from the lens or the cornea) to be substantially in focus if a numerical focus measure for the region exceeds a threshold or achieves a local maximum. To determine a numerical focus measure for a region of an image, the system may determine a frequency domain representation of the region of the image (e.g., by a Fourier transformation). The system may determine the numerical focus measure based on a ratio of: (i) a norm of a "high-frequency" portion of the frequency domain representation of the region, and (ii) a norm of a "low-frequency" portion of the frequency domain representation of the region. The high-frequency portion of the frequency domain representation of the region may correspond to frequencies above a predetermined threshold frequency, and the low-frequency portion of the frequency domain representation of the region may correspond to frequencies below the predetermined threshold frequency. The norm may be, for example, the energy under the aforesaid frequency bands. Analogously, the system may determine a region of an image to be substantially out of focus if a numerical focus measure of the region is below a threshold or achieves a local minimum. In some implementations, the measure of focus maybe the plurality of the outputs of a filter bank tuned to maximally respond to in-focus patterns (e.g. edge detectors at various scales and orientations).

The system uses the one or more images to generate features characterizing the lens based on the reflection of the light from the lens (706). A few examples follow.

In some implementations, the system may generate one or more features characterizing the geometry of the light reflected from the lens. An example process for determining features characterizing the geometry of the light reflected from the lens is described with reference to FIG. 8.

In some implementations, the system may generate one or more features characterizing a color of the light reflected from the lens. The color of the light reflected from the lens may depend on a coating of the lens, for example, a blue light filter coating. In a particular example, the system may generate features which characterize an average color of the light reflected from the lens. In this example, the system may process an image depicting the light reflected from the lens using a segmentation procedure to determine which pixels of the image correspond to the light reflected from the lens. The system may determine the average color of the light reflected from the lens by determining an average of the color values (e.g., RGB color values) associated with the pixels corresponding to the light reflected from the lens. More generally, the system can determine any appropriate statistics (e.g., measures of central tendency or measures of variance) of the color of the light reflected from the lens.

Optionally, the system may generate one or more features characterizing the lens which do not directly depend on the reflection of light from the lens. For example, the system may generate one or more features characterizing the tint (i.e., inherent color) of the lens, or strength of a reflection normalized with respect to the distance of the predetermined light source to characterize the anti-reflective coating of the lens. Such lens features are deemed to be more ephemeral than its prescription, and thus will be treated accordingly, for instance they will be given a higher weight only if the time between their registration and verification is not too long.

The system generates one or more features characterizing the lens based on the reflection of the light from the cornea of the user (708). For example, the system may determine a feature based on a difference between: (i) the camera focal length that causes the light reflected from the lens to be substantially in focus ($F_1$), and (ii) the camera focal length that causes the light reflected from the cornea to be substantially in focus ($F_2$). In a particular example, the system may determine the feature to be: $F_1$-$F_2$. A feature determined in this manner is a function of the spherical power of the lens, and therefore can be understood to (directly or indirectly) characterize the spherical power of the lens. As another example, the system may determine a feature based on a difference between: (i) the focal length that causes the light reflected from the cornea to be substantially in focus except along a particular axis ($F_3$), and (ii) the focal length that causes the light reflected from the cornea to be substantially out of focus except along the particular axis ($F_4$). In a particular example, the system may determine the feature to be: $F_3$-$F_4$. A feature determined in this manner is a function of the cylindrical power of the lens, and therefore can be understood to (directly or indirectly) characterize the cylindrical power of the lens. In some implementations, the projected patterns are concentric circles (or other concentric shapes). The angle of the particular axis along which light reflected from the cornea is substantially in or out of focus, depending on the camera focal length, indicates the cylindrical angle of the lens. The cylindrical angle of the lens can be used as an additional feature.

The system determines the identity of the user based at least in part on features characterizing the lens of the eyeglasses (710). More specifically, the system can determine the identity of the user based at least in part on: (i) the features characterizing the lens based on the reflection(s) of the light from the lens, (ii) the features characterizing the lens based on the reflection of the light from the cornea, or (iii) both. In one example, the system can determine the identity of the user by matching the features characterizing the lens to a "template" set of features associated with a particular user profile. The template set of features associated with the particular user profile may characterize the lens of eyeglasses of a particular user, and may have been generated during an enrollment process. The system determine that the features characterizing the lens match the template features if a numerical similarity measure (e.g., a cosine similarity measure) or distance measure (e.g. Euclidean or Mahalanobis distance) between them satisfies (e.g., exceeds the similarity or falls below the distance) a threshold. In some cases, the system determines the identity of the user using other data in addition to the features characterizing the lens. For example, the system can determine the identity of the user based on additional features characterizing biometric properties of the user (e.g., eye vasculature structure or facial appearance). As another example, the system can further use a password or PIN submitted by the user in determining the identity of the user.

In some implementations, the user is required to provide stronger primary authenticator (e.g. an eye or face scan matched at higher threshold or required a second factor) if weaker indicators (e.g., lens features) have changed beyond a preset threshold compared to their originally enrolled (i.e., template) values. In some implementations this threshold is set to be even higher if the perceived prescription of the lens seems to have changed as well.

Figure 8:
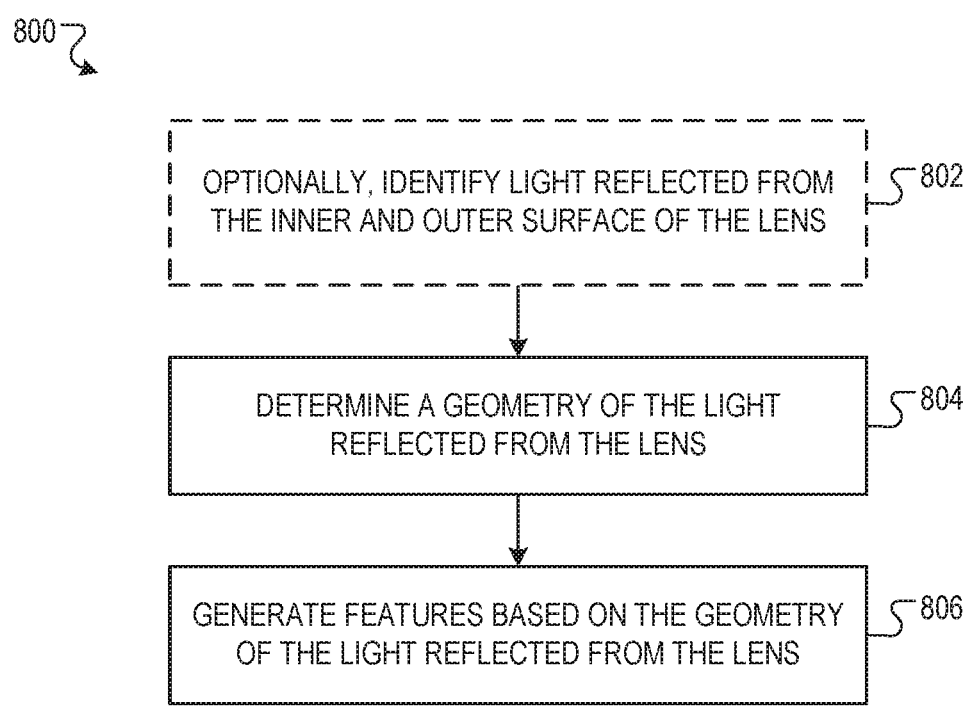
FIG. 8 is a flow diagram of an example process for determining features characterizing a geometry of light reflected from a lens.

FIG. 8 is a flow diagram of an example process 800 for determining features characterizing the geometry of light reflected from a lens. For convenience, the process 800 will be described as being performed by a system of one or more computers located in one or more locations. For example, an authentication system, e.g., the authentication system 100 of FIG. 1, appropriately programmed in accordance with this specification, can perform the process 800.

Optionally, the system can identify: (i) the light reflected from the outer surface of the lens, and (ii) the light reflected from the inner surface of the lens (802). For example, the system can obtain a first image and a second image that depict the light reflected from the lens at different time points (e.g., 1 millisecond apart). The system may process the first image and the second image to generate a corresponding optical flow image which defines a motion field characterizing the displacement of each pixel from the first image to the second image (as illustrated by FIG. 4). In particular, the optical flow image may define a respective displacement vector characterizing an "x-displacement" and a "y-displacement" of each pixel from the first image to the second image. If the lens has moved between the first image and the second image (e.g., because of breathing motion of a user wearing eyeglasses which include the lens), then the respective reflections of the light from the inner and the outer surface of the lens will also have moved. The system can process the optical flow image to identify the respective reflections of the light from the inner surface and the outer surface of the lens based on differences in their respective motions as characterized by the optical flow image.

The system determines a geometry of the light reflected from the lens (804). The geometry of the light reflected from the lens can refer to any aspect of the shape or arrangement of the light reflected from the lens (e.g., geometrical features). For example, the system may determine the geometry of the light reflected from the lens by determining the coordinates of one or more "points of interest" in the light reflected from the lens. In a particular example, if the light reflected from the lens is a constellation of points of light, then each point of light may represent a respective point of interest. As another example, if the light reflected from the lens includes a geometric shape with corners (e.g., a square or rectangle), then each corner of the geometric shape may represent a respective point of interest. Optionally, the system may determine a respective geometry of: (i) the light reflected from the inner surface of the lens, and (ii) the light reflected from the outer surface of the lens. Generally, the system can determine the geometry of the light being reflected from the lens using appropriate image processing techniques. For example, to determine points of interest in the light reflected from the lens, the system may process an image depicting the light reflected from the lens using a blob detection technique or a corner detection technique. Each corner might also be distinguished by detecting its code (e.g. if a different Barker sequences is used to illuminate different vertices).

The system generates features based on the geometry of the light reflected from the lens (806). A few examples follow.

In some implementations, the system may generate features defining the coordinates of one or more points of interest of the light reflected from the lens.

In some implementations, the system may generate features which characterize a difference between: (i) the geometry of the light reflected from the inner surface of the lens, and (ii) the geometry of the light reflected from the outer surface of the lens. For example, the system may generate features which characterize a "distortion" between the respective geometries of the light reflected from the inner surface and outer surface of the lens. In a particular example, the system may determine the distortion based on a respective distance (e.g., Euclidean distance) between corresponding points of interest in: (i) the light reflected from the inner surface of the lens, and (ii) the light reflected from the outer surface of the lens. As another example, the system may generate features which characterize a difference between the respective "sizes" of the geometries of the light reflected from the inner surface and outer surface of the lens. The size of the geometry of the light reflected from the surface of a lens can refer to, for example, an area of a geometric shape defined by the reflected light. In a particular example, the geometry of the light reflected from a surface of a lens may define the coordinates of the corners of a rectangle of light. In this example, the system may determine the size of the geometry of the light to be the area of the rectangle defined by the coordinates of the corners of the rectangle.

The system can normalize (i.e., adjust) the features characterizing the geometry of the light reflected from the lens based on the relative positions of: (i) the light sources projecting the light, and (ii) the lens. The system can determine the relative positions of the light sources and the lens based on, for example, the apparent distances and locations of known landmarks (e.g., the eyes of the user).

If a time-varying pattern of light is projected onto the lens, the system can determine respective features characterizing the geometry of the pattern of light reflected from the lens at each of multiple time points. In some cases, the system may generate features which characterize a difference between: (i) the geometry of the pattern of light reflected from the lens at a first time point, and (ii) the geometry of the pattern of light reflected from the lens at a second time point. In a particular example, the system may generate features which characterize a respective distance (e.g., a Euclidean distance) between corresponding points of interest in: (i) the pattern of light reflected from the lens at the first time point, and (ii) the pattern of light reflected from the lens at the second time point.

Figure 9:
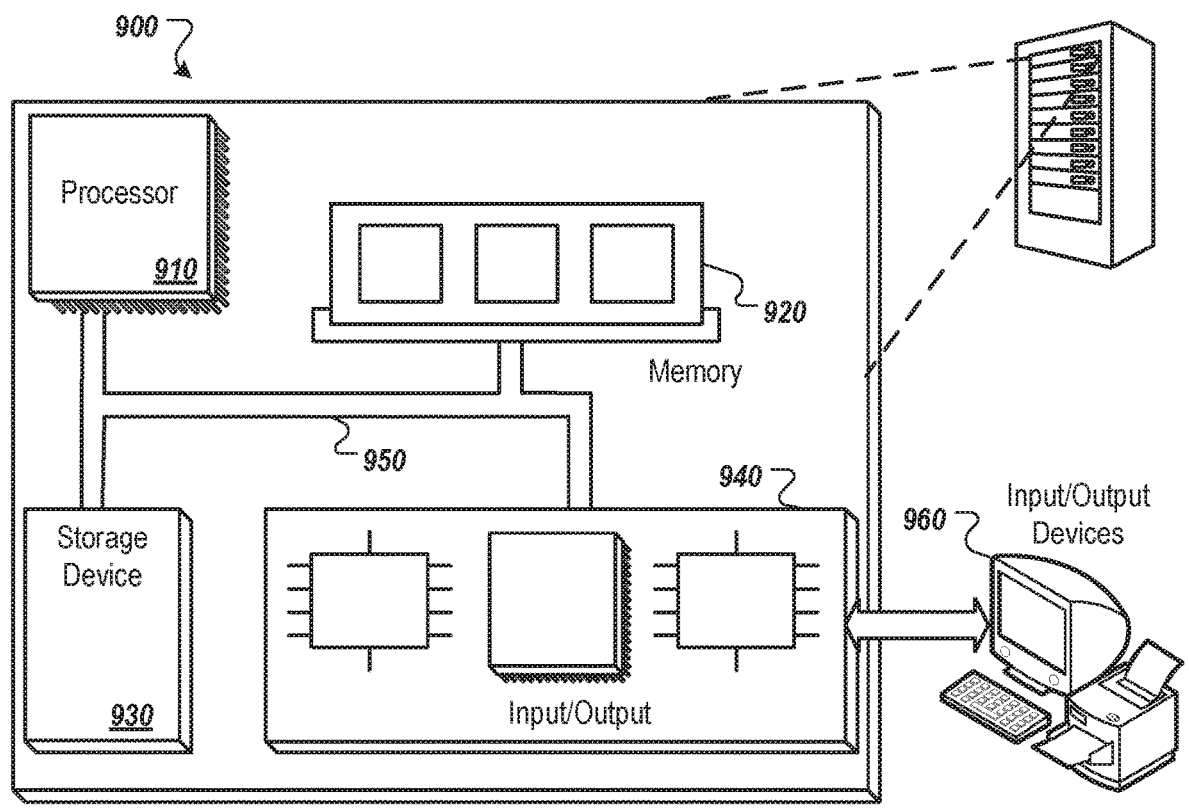
FIG. 9 is block diagram of an example computer system.

FIG. 9 is block diagram of an example computer system 900 that can be used to perform operations described above. The system 900 includes a processor 910, a memory 920, a storage device 930, and an input/output device 940. Each of the components 910, 920, 930, and 940 can be interconnected, for example, using a system bus 950. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the system 900. In one implementation, the memory 920 is a computer-readable medium. In one implementation, the memory 920 is a volatile memory unit. In another implementation, the memory 920 is a non-volatile memory unit.

The storage device 930 is capable of providing mass storage for the system 900. In one implementation, the storage device 930 is a computer-readable medium. In various different implementations, the storage device 930 can include, for example, a hard disk device, an optical disk device, a storage device that is shared over a network by multiple computing devices (e.g., a cloud storage device), or some other large capacity storage device.

The input/output device 940 provides input/output operations for the system 900. In one implementation, the input/output device 940 can include one or more network interface devices, e.g., an Ethernet card, a serial communication device, e.g., and RS-232 port, and/or a wireless interface device, e.g., and 802.11 card. In another implementation, the input/output device can include driver devices configured to receive input data and send output data to other input/output devices, e.g., keyboard, printer and display devices 960. Other implementations, however, can also be used, such as mobile computing devices, mobile communication devices, set-top box television client devices, etc.

Although an example processing system has been described in FIG. 9, implementations of the subject matter and the functional operations described in this specification can be implemented in other types of digital electronic circuitry, or in computer software, firmware, or hardware, including the structures disclosed in this specification and their structural equivalents, or in combinations of one or more of them.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine, in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more data processing apparatus, the method comprising:
    obtaining at least one image depicting a reflection of light from a lens that is included in a set of eyeglasses;
    determining, based on the reflection of light from the lens, a set of features characterizing the lens, comprising:
        determining a geometry of the reflection of light from the lens; and
        determining one or more features characterizing the lens based on the geometry of the reflection of the light from the lens; and
    determining an identity of a corresponding user based at least in part on the set of features characterizing the lens.

2. The method of claim 1, wherein the light comprises a predetermined pattern of light projected from one or more light sources.

3. The method of claim 2, wherein:
    at each of a plurality of time steps, the light sources project a respective pattern of light onto the lens,
    obtaining the at least one image depicting the reflection of light from the lens comprises:
        obtaining, at each of the plurality of time steps, a respective image depicting a reflection of the respective pattern of light projected onto the lens at the time step, and
    determining the set of features characterizing the lens comprises:
        determining at least a portion of the set of features characterizing the lens based on the reflection of the respective pattern of light projected onto the lens at each of the plurality of time steps.

4. The method of claim 3, wherein at each of the plurality of time steps, the light sources project onto the lens a given pattern of light that is rotated to a respective angle.

5. The method of claim 1, wherein determining the geometry of the reflection of the light from the lens comprises:
    identifying: (i) a first reflection of the light from an outer surface of the lens, and (ii) a second reflection of the light from an inner surface of the lens; and
    determining: (i) a first geometry of the first reflection of the light from the outer surface of the lens, and (ii) a second geometry of the second reflection of the light from the inner surface of the lens.

6. The method of claim 5, wherein determining the one or more features characterizing the lens comprises:
determining one or more features based on a difference between the first geometry and the second geometry.

7. The method of claim 6, wherein determining the one or more features based on a difference between the first geometry and the second geometry comprises:
determining the one or more features based on a measure of distortion between the first geometry and the second geometry.

8. The method of claim 6, wherein determining the one or more features based on a difference between the first geometry and the second geometry comprises:
determining the one or more features based on a difference in size between the first geometry and the second geometry.

9. The method of claim 1, wherein the set of features characterize properties of the lens comprising one or more of: a spherical power of the lens, a cylindrical power of the lens, a cylindrical angle of the lens, a coating of the lens, a tint of the lens, a curvature of an inner surface of the lens, and a curvature of an outer surface of the lens.

10. The method of claim 1, further comprising:
determining, based on a reflection of the light from a cornea of an eye of the corresponding user, an additional set of features characterizing the lens; and
determining the identity of the corresponding user based at least in part on the additional set of features characterizing the lens.

11. The method of claim 10, wherein determining the additional set of features characterizing the lens comprises:
determining a first focal length that causes the reflection of the light from the lens to be substantially in focus;
determining a second focal length that causes the reflection of the light from the cornea to be substantially in focus; and
determining the additional set of features based on a difference between the first focal length and the second focal length.

12. The method of claim 10, wherein determining the additional set of features characterizing the lens comprises:
determining a third focal length that causes the reflection of light from the cornea to be substantially in focus except along a particular axis;
determining a fourth focal length that causes the reflection of light from the cornea to be substantially out of focus except along the particular axis; and
determining the additional set of features based on a difference between the third focal length and the fourth focal length.

13. The method of claim 1, wherein determining the identity of the corresponding user based at least in part on the set of features characterizing the lens comprises:
determining that a difference between: (i) the set of features characterizing the lens, and (ii) a template set of features determined during an enrollment process, satisfies a threshold condition; and
in response to determining that the difference satisfies the threshold condition, determining the identity of the corresponding user based on one or more additional features characterizing the identity of the corresponding user.

14. A system comprising:
computer-readable memory;
a feature generation engine comprising one or more processing devices, the feature generation engine configured to perform operations comprising:
obtaining at least one image depicting a reflection of light from a lens that is included in a set of eyeglasses, and
determining, based on the reflection of light from the lens, a set of features characterizing the lens, comprising:
determining a geometry of the reflection of light from the lens; and
determining one or more features characterizing the lens based on the geometry of the reflection of the light from the lens; and
an authentication engine comprising one or more processing devices, the authentication engine configured to determine or verify an identity of a corresponding user based at least in part on the set of features characterizing the lens.

15. The system of claim 14, wherein the light is a predetermined pattern of light projected from one or more light sources.

16. The system of claim 15, wherein:
at each of a plurality of time steps, the light sources project a respective pattern of light onto the lens,
obtaining the at least one image depicting the reflection of light from the lens comprises:
obtaining, at each of the plurality of time steps, a respective image depicting a reflection of the respective pattern of light projected onto the lens at the time step, and
determining the set of features characterizing the lens comprises:
determining at least a portion of the set of features characterizing the lens based on the reflection of the respective pattern of light projected onto the lens at each of the plurality of time steps.

17. The system of claim 16, wherein at each of the plurality of time steps, the light sources project onto the lens a given pattern of light that is rotated to a respective angle.

18. The system of claim 14, wherein determining the geometry of the reflection of the light from the lens comprises:
identifying: (i) a first reflection of the light from an outer surface of the lens, and (ii) a second reflection of the light from an inner surface of the lens; and
determining: (i) a first geometry of the first reflection of the light from the outer surface of the lens, and (ii) a second geometry of the second reflection of the light from the inner surface of the lens.

19. The system of claim 18, wherein determining the one or more features characterizing the lens comprises:
determining one or more features based on a difference between the first geometry and the second geometry.

20. The system of claim 19, wherein determining the one or more features based on a difference between the first geometry and the second geometry comprises:
determining the one or more features based on a measure of distortion between the first geometry and the second geometry.

21. The system of claim 19, wherein determining the one or more features based on a difference between the first geometry and the second geometry comprises:
determining the one or more features based on a difference in size between the first geometry and the second geometry.

22. The system of claim 14, wherein the set of features characterize properties of the lens comprising one or more of: a spherical power of the lens, a cylindrical power of the lens, a cylindrical angle of the lens, a coating of the lens, a tint of the lens, a curvature of an inner surface of the lens, and a curvature of an outer surface of the lens.

23. The system of claim 15, wherein the one or more processing devices are configured to:
  determine, based on a reflection of the light from a cornea of an eye of the corresponding user, an additional set of features characterizing the lens; and
  determine the identity of the corresponding user based at least in part on the additional set of features characterizing the lens.

24. The system of claim 23, wherein determining the additional set of features characterizing the lens comprises:
  determining a first focal length that causes the reflection of the light from the lens to be substantially in focus;
  determining a second focal length that causes the reflection of the light from the cornea to be substantially in focus; and
  determining the additional set of features based on a difference between the first focal length and the second focal length.

25. The system of claim 23, wherein determining the additional set of features characterizing the lens comprises:
  determining a third focal length that causes the reflection of light from the cornea to be substantially in focus except along a particular axis;
  determining a fourth focal length that causes the reflection of light from the cornea to be substantially out of focus except along the particular axis; and
  determining the additional set of features based on a difference between the third focal length and the fourth focal length.

26. The system of claim 14, wherein determining the identity of the corresponding user based at least in part on the set of features characterizing the lens comprises:
  determining that a difference between: (i) the set of features characterizing the lens, and (ii) a template set of features determined during an enrollment process, satisfies a threshold condition; and
  in response to determining that the difference satisfies the threshold condition, determining the identity of the corresponding user based on one or more additional features characterizing the identity of the corresponding user.

27. One or more non-transitory computer-readable storage devices storing instructions that upon execution cause one or more processing devices to perform operations comprising:
  obtaining at least one image depicting a reflection of light from a lens that is included in a set of eyeglasses;
  determining, based on the reflection of light from the lens, a set of features characterizing the lens, comprising:
    determining a geometry of the reflection of light from the lens; and
    determining one or more features characterizing the lens based on the geometry of the reflection of the light from the lens; and
  determining an identity of a corresponding user based at least in part on the set of features characterizing the lens.

28. A method performed by one or more data processing apparatus, the method comprising:
  obtaining at least one image depicting a reflection of light from a lens that is included in a set of eyeglasses;
  determining, based on the reflection of light from the lens, a set of features characterizing the lens, wherein the set of features characterize properties of the lens comprising one or more of: a spherical power of the lens, a cylindrical power of the lens, a cylindrical angle of the lens, a coating of the lens, a tint of the lens, a curvature of an inner surface of the lens, and a curvature of an outer surface of the lens; and
  determining an identity of a corresponding user based at least in part on the set of features characterizing the lens.

* * * * *